United States Patent
Redko et al.

(10) Patent No.: US 10,078,641 B1
(45) Date of Patent: Sep. 18, 2018

(54) OPTIMIZED LOCK DETECTION IN A CHANGE BLOCK TRACKER

(71) Applicant: Acronis International GbmH, Schaffhausen (CH)

(72) Inventors: Andrey Redko, Moscow (RU); Stanislav S. Protassov, Moscow (RU); Serguei M. Beloussov, Singapore (SG); Mark Shmulevich, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 256 days.

(21) Appl. No.: 14/985,211

(22) Filed: Dec. 30, 2015

(51) Int. Cl.
G06F 17/30 (2006.01)
G06F 11/14 (2006.01)

(52) U.S. Cl.
CPC .... G06F 17/30088 (2013.01); G06F 11/1448 (2013.01)

(58) Field of Classification Search
CPC .................................................. G06F 17/30088
See application file for complete search history.

(56) References Cited

U.S. PATENT DOCUMENTS

| | | | | |
|---|---|---|---|---|
| 9,171,002 B1* | 10/2015 | Mam | ................ | G06F 17/30091 |
| 9,400,613 B1* | 7/2016 | Chopra | ................... | G06F 3/065 |
| 9,665,307 B1* | 5/2017 | LeCrone | ................. | G06F 3/065 |
| 9,753,813 B1* | 9/2017 | Fan | ...................... | G06F 11/1448 |
| 9,773,007 B1* | 9/2017 | Golden | ................... | G06F 12/08 |
| 9,823,974 B1* | 11/2017 | Madiraju Varadaraju | | G06F 11/1448 |
| 2013/0332660 A1* | 12/2013 | Talagala | .............. | G06F 12/0246 711/103 |
| 2015/0143064 A1* | 5/2015 | Bhargava | ............ | G06F 11/1451 711/162 |
| 2016/0077920 A1* | 3/2016 | Regni | ............... | G06F 17/30575 707/649 |
| 2016/0147607 A1* | 5/2016 | Dornemann | ........ | G06F 11/1435 711/162 |
| 2016/0154817 A1* | 6/2016 | Mason, Jr. | ........ | G06F 17/30171 707/704 |
| 2017/0264684 A1* | 9/2017 | Spillane | .............. | H04L 67/1095 |

* cited by examiner

*Primary Examiner* — Syed H Hasan
(74) *Attorney, Agent, or Firm* — Arent Fox LLP (57) ABSTRACT

A method for optimizing lock detection in a change block tracker (CBT). A volume subject to the backup constantly receives writes. Therefore, it is important to divide writes that occurred before the lock and the write that occurred after the lock. The CBT is installed into kernel at the installation of the backup agent (application). The detection of changes is started at the completion of a previous snapshot. Snapshot creation request (SCR) is generated. Lock request is received by the CBT. Once the lock request is intercepted, the current changes are moved to frozen changes. The CBT processes the SCR and creates a collection of changes—i.e., snapshot with a Name. The CBT moves the current changes to the snapshot Name.

20 Claims, 7 Drawing Sheets

OPTIMIZED LOCK DETECTION IN A CHANGE BLOCK TRACKER

FIELD

This disclosure relates to a method for backup of using change block tracker (CBT), and more particularly, to optimized lock detection in the change block tracker.

BACKGROUND

Snapshots, also referred to as shadow copies, are commonly used to recreate a state of data storage volumes. A snapshot is a record of the state of a volume at a particular time, e.g., a snapshot time. Snapshots are commonly used to create backup copies of data storage volumes. Different techniques are used for different types of snapshots. For example, some snapshots represent a complete copy of the volume. A backup client creates a backup copy of the volume by transferring the complete copy of the volume as a snapshot to a secure data storage location. Some snapshots are differential and include only the data blocks of a volume that have changed since the snapshot creation time point. For snapshots of this kind, the backup client creates the backup copy by copying the snapshot, as well as any data blocks from the volume that are not represented in the snapshot (i.e., those data blocks that have been modified since the snapshot time).

Creating a full backup copy of a volume using a snapshot or other mechanisms often requires considerable system resources and can take an undesirably long time. For example, a complete copy of a snapshot must be read and copied to a secure backup storage location. When a differential snapshot is used, the backup copy must be recreated from the snapshot and from the in-use volume. A backup can be streamlined by using differential or incremental backup techniques. According to differential techniques, a full backup copy of a volume can be created from a snapshot of the volume. After the full backup copy is created, one or more differential backup copies are created with reference to the full backup copy.

Each differential backup copy includes only data blocks that have been modified since the last full backup copy was created. The backed-up volume can be restored by applying the full backup copy and the most recent differential backup copy. Incremental techniques also utilize a full backup copy. A first incremental backup copy is generated including data blocks that have been modified since the full backup copy was created. Subsequent incremental backup copies include data blocks that have been modified since the most recent incremental backup copy was created. In this way, each incremental backup copy is referenced either to the full backup copy (e.g., the first incremental backup copy) or to a prior incremental backup copy.

Both differential and incremental backup techniques require the backup client to identify data blocks that have changed since the creation of a prior backup copy. This can be accomplished by comparing a hash or checksum of each data block on the volume to a hash of checksum of the equivalent location in the prior backup copy. This process is often computationally expensive, as the entire volume must be read to determine which data blocks have changed. This is accomplished by a change block tracker (CBT) utility which detects all the data blocks (i.e., disk sectors) that have changed during the backup.

The backup client needs to know the data blocks that are modified between the snapshot time of the snapshot used to create the backup copy and the snapshot time of a snapshot that will be used to create a current backup copy. In various embodiments, this can be determined by monitoring lock requests and input/output (I/O) requests directed to volume. Lock requests are instructions to a volume or an associated driver to place the volume in a read-only state. For example, a snapshot utility may direct a lock request to a volume or its driver before taking a snapshot in order to ensure that the volume remains consistent while the snapshot is created. The backup client may identify the data blocks of the volume that have been modified since the reference copy by examining the I/O requests (e.g., write requests) directed to the volume since the lock request corresponding to the snapshot used to create the reference backup copy.

However, in many computer systems, the backup client is not the only application that can request a snapshot. Other applications may also utilize snapshots including, for example, management applications for managing snapshots, fast recovery applications, etc. Further, in many computer systems, a lock request does not indicate the application which requested the associated snapshot of the same volume. This means that the backup client may not be able to determine whether any given lock request is associated with its own snapshot request or a snapshot request from another application. Accordingly, it is desired to have the backup client configured to synchronize change tracking with requested snapshots.

A volume subject to the snapshot receives locks for a period of time when the snapshot is being created. However, an accurate detection of locks is required in order to have them used in the CBT algorithm, which detects the data blocks (i.e., disk blocks or sectors) that have been changed during the backup. As discussed above, the locks can be applied to the volume by different snapshot operations. In the conventional implementation, all of the locks have to be considered and, as a result, some redundant data is saved into a snapshot because the process cannot determine the exact locks relevant for a given snapshot. In other words, the resulting snapshot contains data that did not change during the snapshot, while this data is deemed to have been changed by the CBT. In another scenario, multiple locks can cause data losses, because some locks are not properly considered. Therefore, it is critical to detect the locks corresponding to the current snapshot and optimize the functionality of the CBT.

Accordingly, a method for optimization of lock detection in a change block tracker (CBT) is desired.

SUMMARY

Accordingly, this disclosure relates to a method for backup of a volume using change block tracker (CBT), and more particularly, to optimized lock detection in the change block tracker, that substantially obviates one or more of the disadvantages of the related art.

In one aspect of the disclosure, a method for minimizing a number of redundant sectors stored into a backup, as a result of accurate detection of locks applied to a particular volume subject to a backup, is provided.

A volume subject to the backup constantly receives writes. Therefore, it is important to divide writes that occurred before the lock and writes that occurred after the lock. The CBT is installed into the OS kernel at installation of a backup agent (application). The detection of changes is started at the completion of a previous snapshot. A snapshot creation request (SCR) is generated. A lock request is received. Once the lock request is intercepted, the current changes are moved to frozen changes. The CBT processes the SCR and creates a collection of changes—i.e., a snapshot with a Name "Name1." The CBT moves the current changes to the snapshot Name 1.

Then, the next lock is intercepted and the current changes, i.e., those changes made since the snapshot was created, are moved to frozen changes. When the next SCR is received, the collection snapshot "Name2" is created next. When the next lock is intercepted after the SCR is received, the current changes to the storage volume are moved to the collection snapshot "Name2". This process continues to the Nth lock until the client sends a freeze request containing a "Name1" of the snapshot N. At this point the CBT algorithm turns off. The snapshot with the given Name 1 is found, and the processing is started in the chronological order (from 1 to N). On the freeze command, the snapshot device name is known and the process can skip useless data changes to prevent redundant reads from the snapshot.

Additional features and advantages of the disclosure will be set forth in the description that follows, and in part will be apparent from the description, or may be learned by practice of the disclosure. The advantages of the disclosure will be realized and attained by the structure particularly pointed out in the written description and claims hereof as well as the appended drawings.

It is to be understood that both the foregoing general description and the following detailed description are exemplary and explanatory and are intended to provide further explanation of the disclosure as claimed.

BRIEF DESCRIPTION OF THE ATTACHED FIGURES

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Reference will now be made in detail to the preferred embodiments of the present disclosure, examples of which are illustrated in the accompanying drawings.

In one embodiment, a method for optimization of lock detection in a change block tracker (CBT) is provided. The volume subject to the backup constantly receives writes. Therefore, it is important to separate writes that occurred before the lock and the writes that occurred after the lock. For example, in one aspect, all the data changed before the lock has to be included into the current backup, while the data changed after the lock needs to be included into the next backup.

Figure 1:
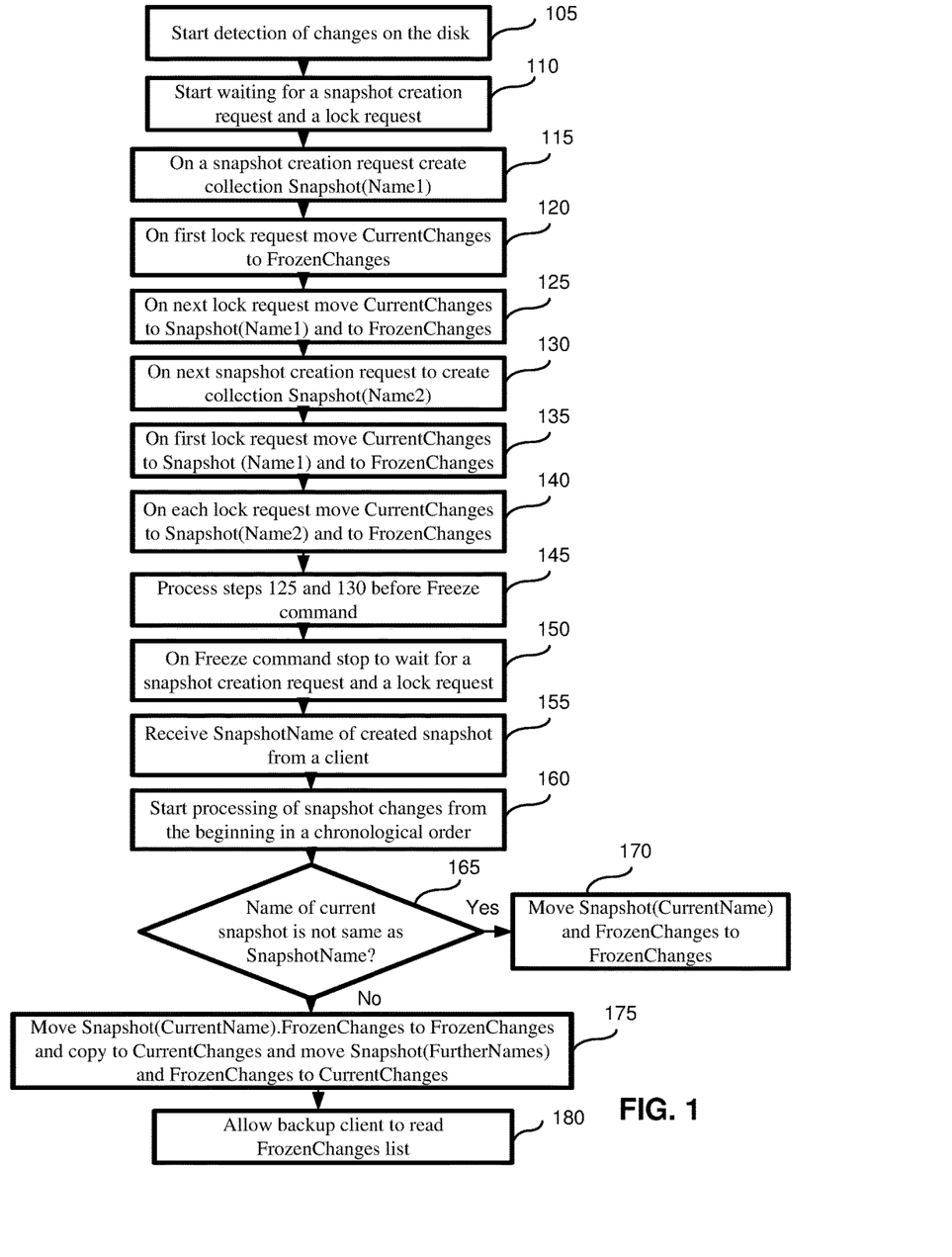
FIG. 1 illustrates an algorithm of optimized lock detection using a read-only snapshot, in accordance with the exemplary embodiment.

An algorithm of optimized lock detection using a read-only snapshot is depicted in FIG. 1, according to one aspect of the disclosure. In step 105, the process starts detection of changes on the disk. In step 110, the process starts to wait for a snapshot creation request and a lock request. In step 115, on a snapshot creation request, the process creates collection Snapshot (Name1). On first lock request, the process moves CurrentChanges to FrozenChanges in step 120. On next lock request, the process moves CurrentChanges to Snapshot (Name1) and to FrozenChanges in step 125, wherein CurrentChanges contains changes occurring since a previous lock request. In step 130, on a next snapshot creation request, the process creates a next collection Snapshot (Name2). In step 135, on a first lock request, the process moves CurrentChanges to Snapshot (Name1) and to FrozenChanges. In step 140, on each lock request, the process moves CurrentChanges to Snapshot (Name2) and to FrozenChanges. In step 145, the steps 125 and 130 are processed before Freeze command. In step 150, on Freeze command, the process stops to wait for a snapshot creation request and a lock request. In step 155, SnapshotName of the created snapshot (e.g., Name1, Name2 . . . NameN) is received from a client.

In step 160, the process starts processing of snapshot changes from the beginning in a chronological order. In step 165, the process checks if a name of current snapshot is not equal to SnapshotName and moves Snapshot (CurrentName) to FrozenChanges in step 170. If, in step 165, a name of a current snapshot is equal to SnapshotName, the process moves Snapshot(CurrentName) to FrozenChanges and copies it to CurrentChanges and moves Snapshot (FurtherNames) to CurrentChanges in step 175. Then, the process allows a backup client to read FrozenChanges list in step 180.

Figure 2:
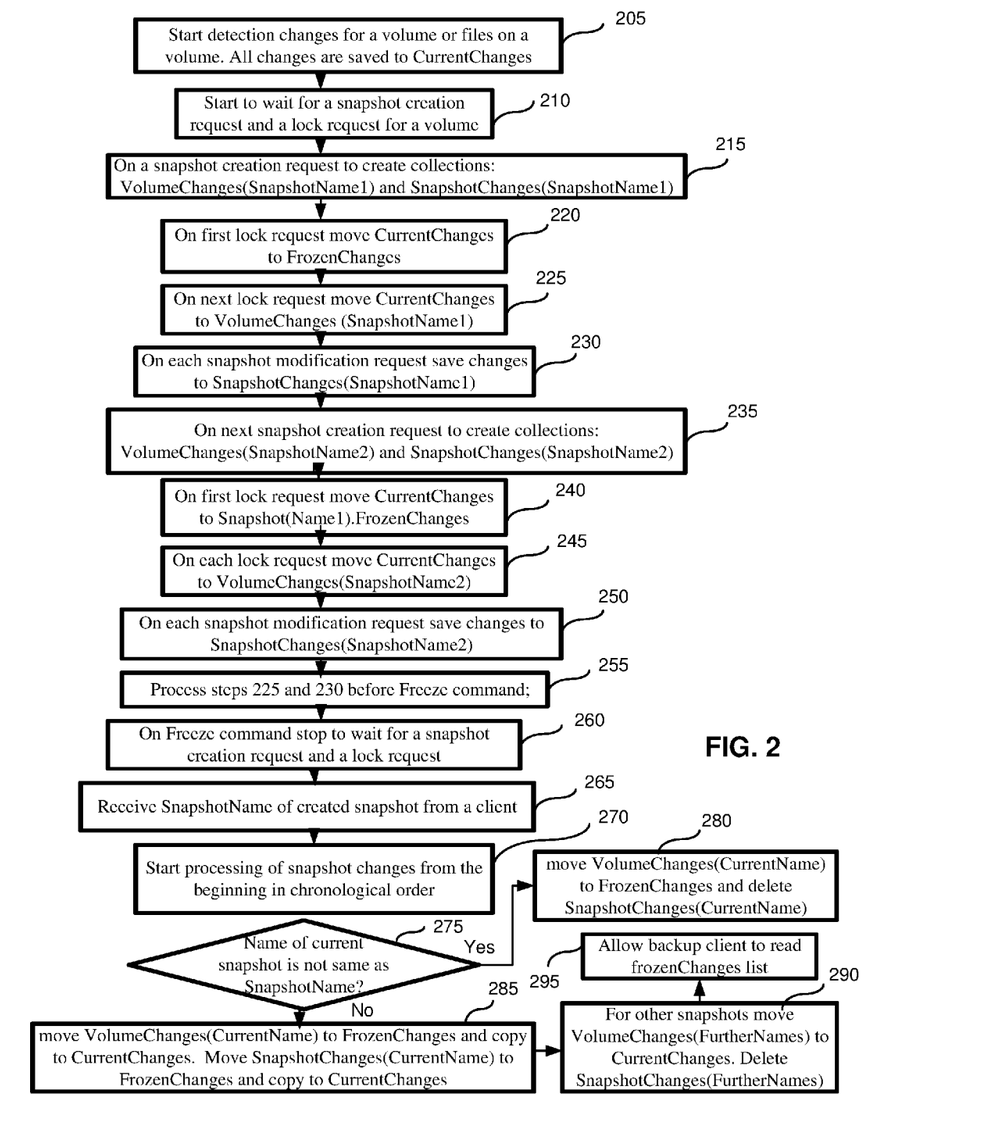
FIG. 2 illustrates an algorithm of optimized lock detection using a writeable snapshot, in accordance with the exemplary embodiment.

An algorithm of optimized lock detection using a writable snapshot is depicted in FIG. 2. In step 205, the process starts detection of changes for a volume or files on a volume. All changes are saved to CurrentChanges. In step 210, the process starts to wait for a snapshot creation request and a lock request for a volume. In step 215, on a snapshot creation request, the process creates collections: VolumeChanges (SnapshotName1) and SnapshotChanges (SnapshotName1). In step 220, on first lock request the process moves CurrentChanges to FrozenChanges. In step 225, on next lock request, the process moves changes occurring after the first lock request, (e.g, the most current version of CurrentChanges) to VolumeChanges (SnapshotName1). In step 230, on each snapshot modification request, the process saves changes to SnapshotChanges (SnapshotName1).

In step 235, on a next snapshot creation request, the process creates collections: VolumeChanges (SnapshotName2) and SnapshotChanges (SnapshotName2). In step 240, on first lock request, the process moves CurrentChanges to SnapshotName1 and to FrozenChanges. In step 245, on each lock request, the process moves CurrentChanges to VolumeChanges (SnapshotName2). In step 250, on each snapshot modification request, the process saves changes to SnapshotChanges (SnapshotName2). In step 255, the steps 225 and 230 are processed. In step 260, on Freeze command, the process stops to wait for a snapshot creation request and for a lock request. In step 265, SnapshotName of created snapshot is received from a client. In step 270, the process starts processing of snapshot changes from the beginning in chronological order. In step 275, the process checks if a name of the current snapshot is not the same as SnapshotName and moves VolumeChanges (CurrentName) to FrozenChanges and deletes SnapshotChanges (CurrentName) in step 280.

If, in step 275, the name of the current snapshot is the same as SnapshotName, the process moves VolumeChanges (CurrentName) to FrozenChanges and copies it to CurrentChanges in step 285. The process also moves SnapshotChanges (CurrentName) to FrozenChanges and copies it to CurrentChanges in step 285. In step 290, for other snapshots, the process moves VolumeChanges (FurtherNames) to CurrentChanges and deletes SnapshotChanges (FurtherNames). Then, the process allows a backup client to read FrozenChanges list in step 290.

Figure 3:
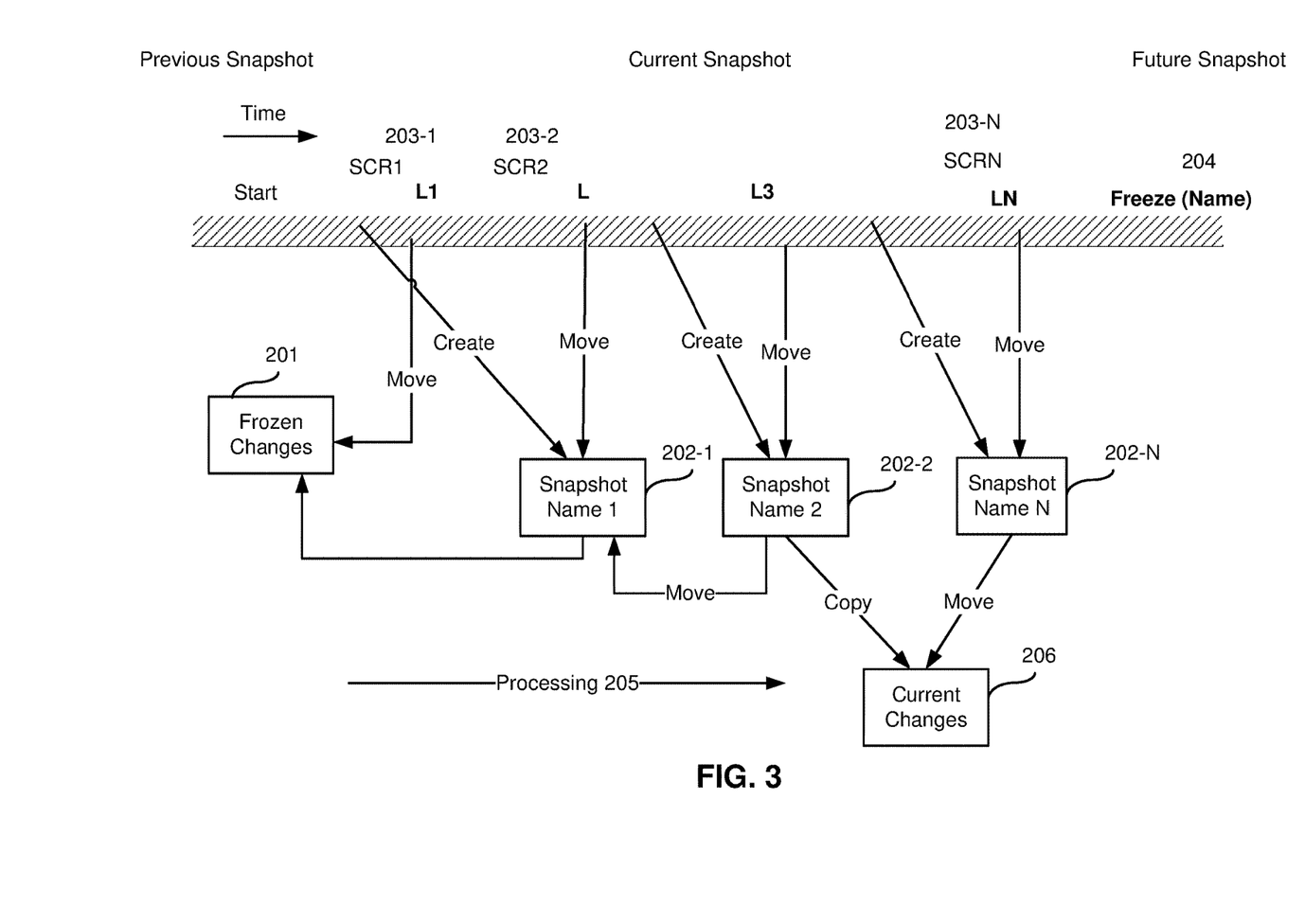
FIG. 3 illustrates a workflow of a process of optimization of lock detection in the change tracker (CBT), in accordance with the exemplary embodiment.

FIG. 3 illustrates a workflow of a process of optimization of lock detection in the change tracker (CBT), in accordance with the exemplary embodiment. The CBT is installed into kernel. The detection of changes is started at the completion of a previous snapshot. A snapshot creation request (SCR1) 203-1 is generated. Lock request L1 is received. Once the lock request is intercepted, the current changes are moved to frozen changes 201. Note that snapshot creation has to be synchronized with the CBT. The CBT processes the SCR1 203-1 and creates a collection of changes 202-1—i.e., the snapshot Name1. The CBT moves the current changes to the snapshot Name 1.

Then, the next lock L is intercepted and the current changes are moved to frozen changes 201. When the SCR2 203-2 is received, the collection snapshot Name 2 (202-2) is created. When the next lock L3 is intercepted, the current changes are moved to the collection snapshot Name 2. This process continues to the lock LN until the client sends a freeze request 204 containing a Name of the snapshot N (202-N). At this point the CBT algorithm turns off. The snapshot with the given Name is found and the processing is started in the chronological order (from 1 to N). On the freeze command the CBT knows the snapshot device name and it can skip useless changes data to prevent redundant reads from the snapshot.

Processing 205 is started. If a current snapshot Name (i.e., 202-2) is not the same as the SnapshotName, the process moves current changes to the frozen changes 201. If a current snapshot Name (i.e., 202-2) is equal to the SnapshotName, the process moves current changes to the frozen changes 201 and copies this data to current changes 206. Then, all snapshots (collections) named after the current one (up to N) are moved to the current changes 206. Thus, the frozen changes can be provided to the client to be read out of the snapshot. Note that this example illustrates a read-only snapshot.

Figure 4:
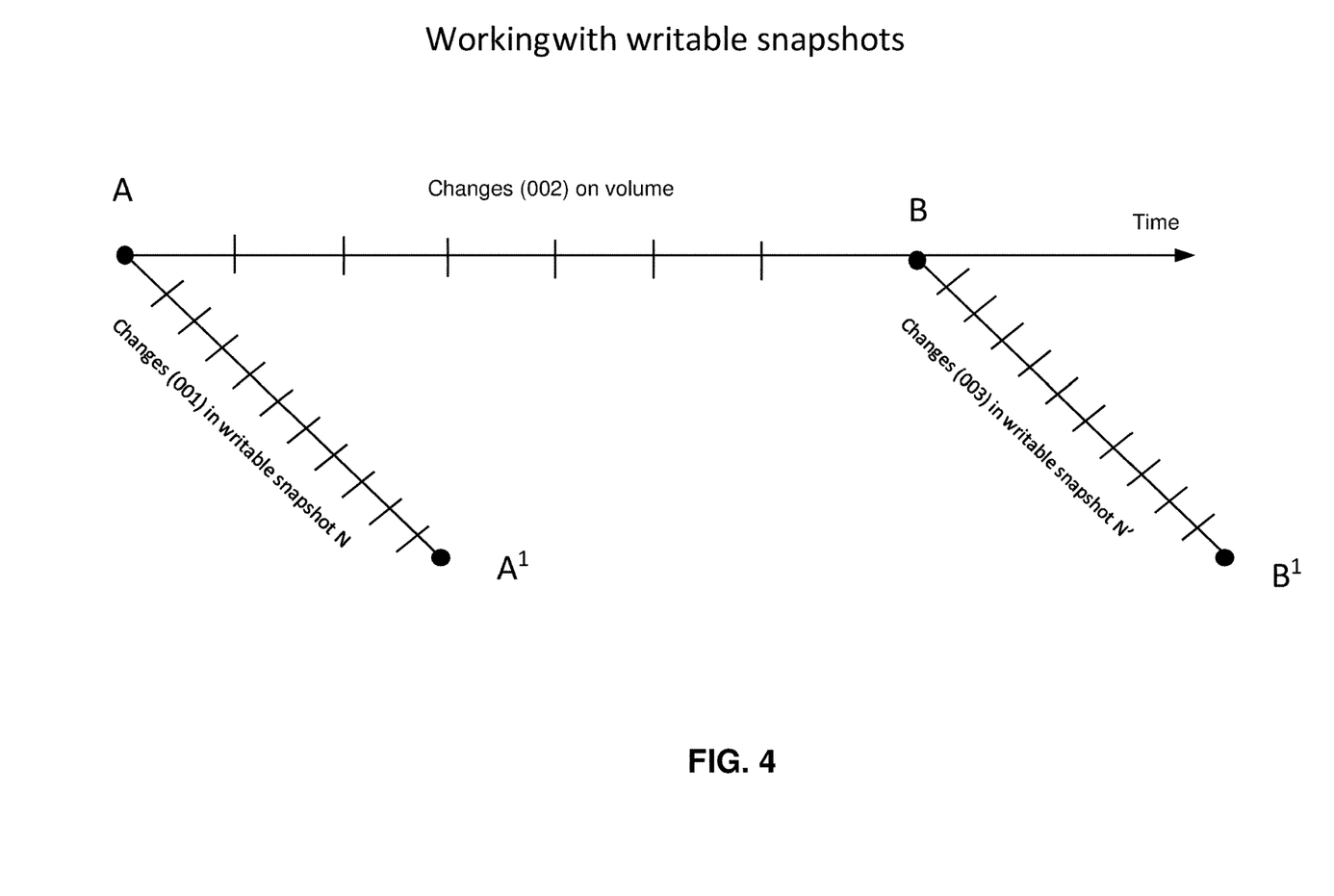
FIG. 4 illustrates a diagram for optimizing lock detection for a writable snapshot.

FIG. 4 illustrates a diagram for optimizing lock detection for a writable snapshot. The writable snapshot is created at point A. Then, some changes (001) are made in this snapshot Usually, Volume Shadow Copy Service (VSS)-compatible applications make such modifications inside the snapshot to complete their work and make all the data consistent. As a result, the modified snapshot is generated at point $A^1$. At the same time, other changes (002) have occurred on the volume. Another snapshot is generated at point B. Changes/modifications (003) have been made in the snapshot by the point $B^1$. Thus, when a backup is created, the following series of changes: $A-A^1$, A-B and $B-B^1$ are taken into consideration.

Figure 5A:
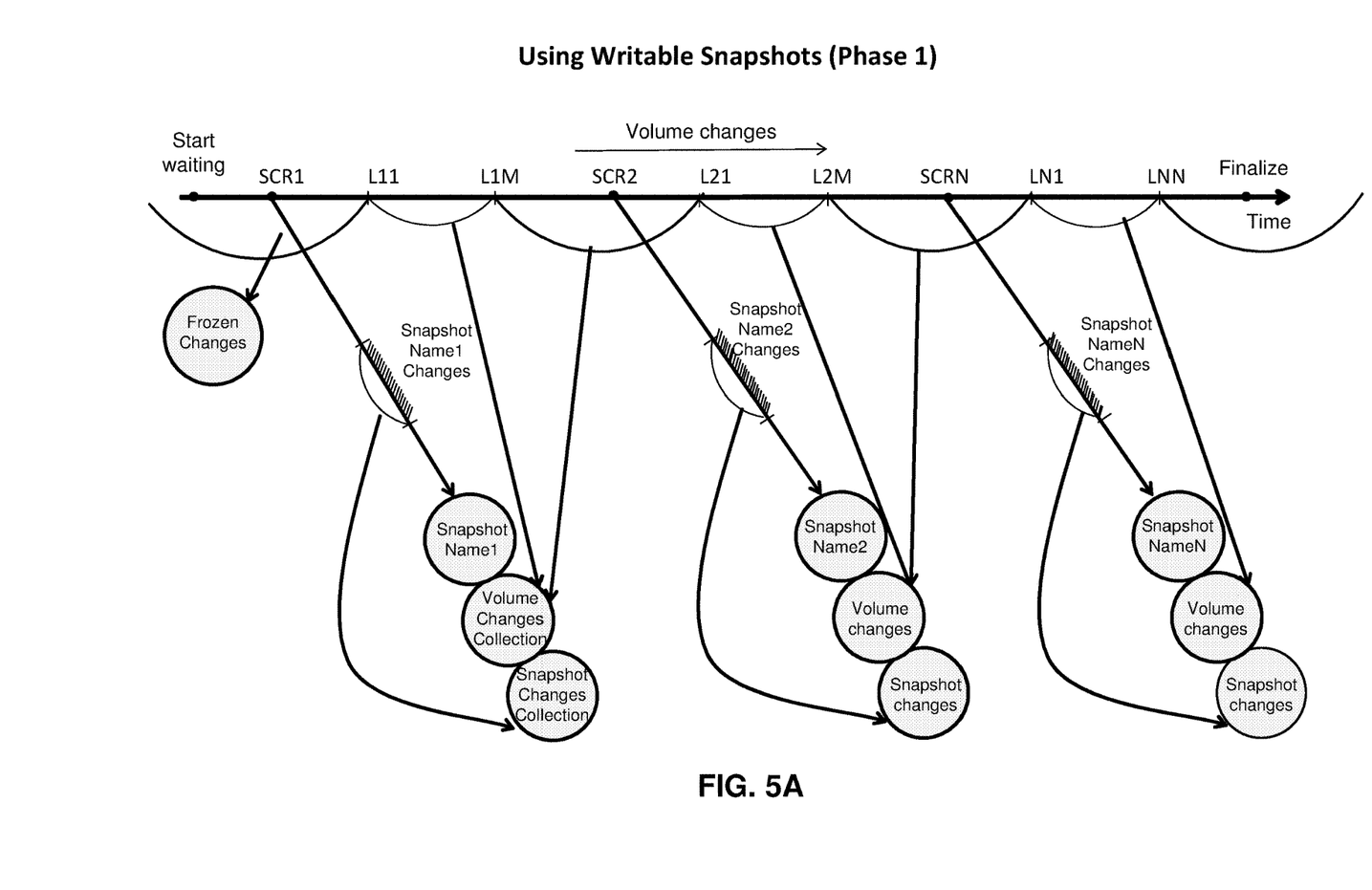
FIG. 5A illustrates a first phase of optimizing lock detection using a writable snapshot, in accordance with the exemplary embodiment.

FIG. 5A illustrates a first phase of using a writable snapshot, in accordance with the exemplary embodiment. The CBT tracks volume changes. The CBT starts waiting for snapshot creation requests (SCRs) and lock requests. The CBT tracks volume snapshot changes. After the SCR1 is received, the snapshot Name1 is created. Then, all volume changes that occur between the lock requests are placed into volume changes for this snapshot. All changes in the snapshot are placed into snapshot changes for this snapshot. Note that all changes that occurred before L11 are placed into frozen changes. In this example, the changes between lock requests L11 and L11 are placed into the volume changes for the snapshot Name1; the changes between lock requests L1M and L21 are placed into the volume changes for snapshot Name1. Then, upon receiving the SCR2, the snapshot Name2 is created. All current snapshot changes are placed into snapshot changes for Name2. All changes that occurred between the L21 and L2M and between L2M and LN1 are placed into volume changes for the snapshot Name2. Then, the snapshot NameN is created upon receiving the SCRN. All current snapshot changes are placed into snapshot changes for NameN. All changes between LN1 and LNM are placed into the volume changes for the snapshot NameN. Then, the CBT finishes the waiting for snapshot creation requests (SCRs) and lock requests.

Figure 5B:
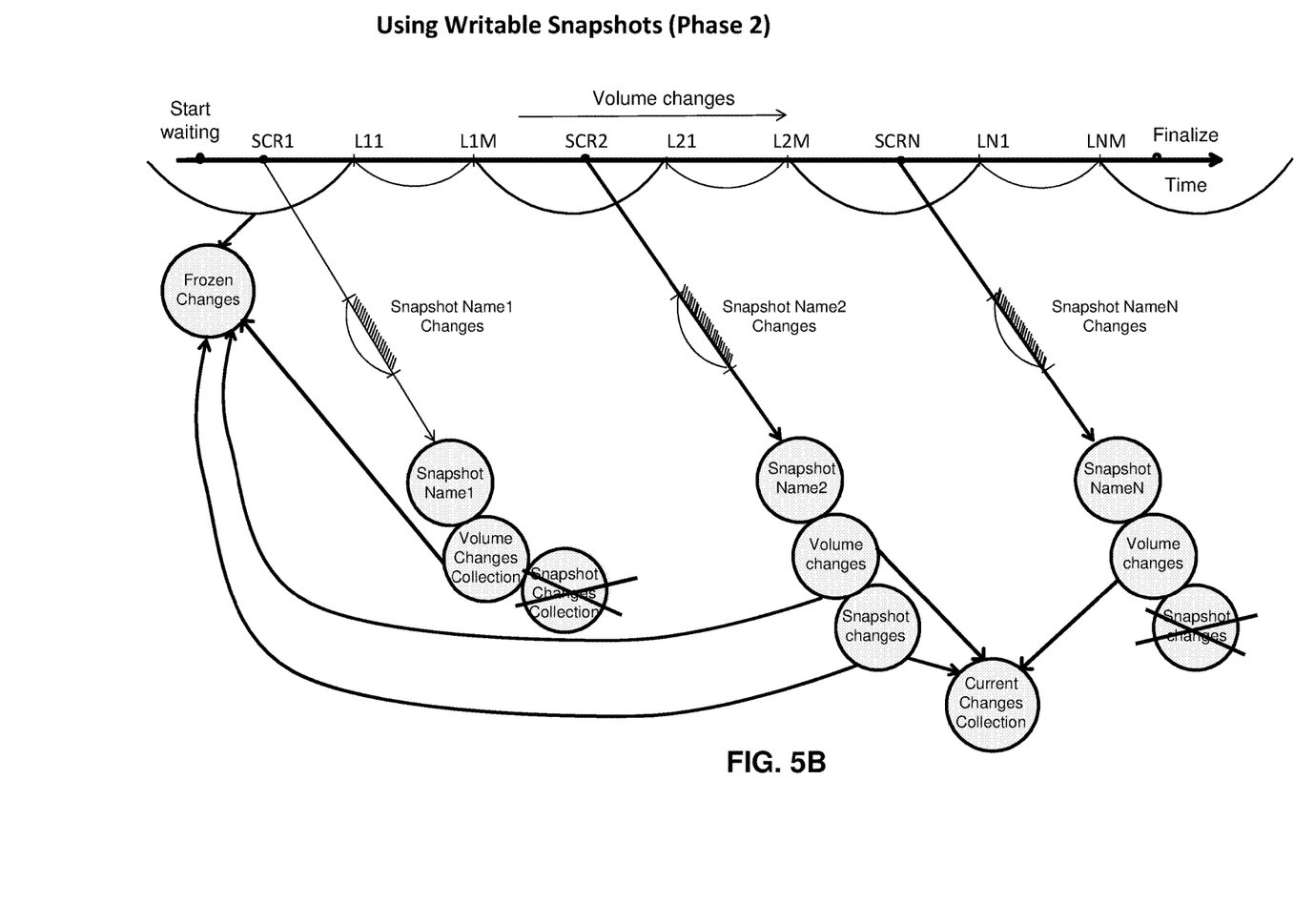
FIG. 5B illustrates a second phase of using optimizing lock detection a writable snapshot, in accordance with the exemplary embodiment.

FIG. 5B illustrates a second phase of using a writable snapshot, in accordance with the exemplary embodiment. The second phase begins after the finalize command (see FIG. 5A). The command finalize provides a name of a current snapshot to the CBT. The CBT starts the collection processing in chronological order. If the name of the current snapshot is the same as the SnapshotName1 according to the SCR1, the process moves volume changes to the frozen changes and discards the snapshot changes collection. In another scenario, if the name of the current snapshot is not the same as the SnapshotName2 according to the SCR2, the snapshot changes are moved to the volume changes. The volume changes are moved to the frozen changes and copied to the current changes collection. The snapshot changes are also copied to the current changes collection.

In case of SCRN, the current snapshot is the same as the SnapshotNameN. All changes are moved to the volume changes that are copied to the current changes and the snapshot changes are deleted. Thus, redundant changes of the same writable snapshot are not saved. Then, the CBT provides frozen changes collection to the backup engine and continue tracking process.

Figure 6:
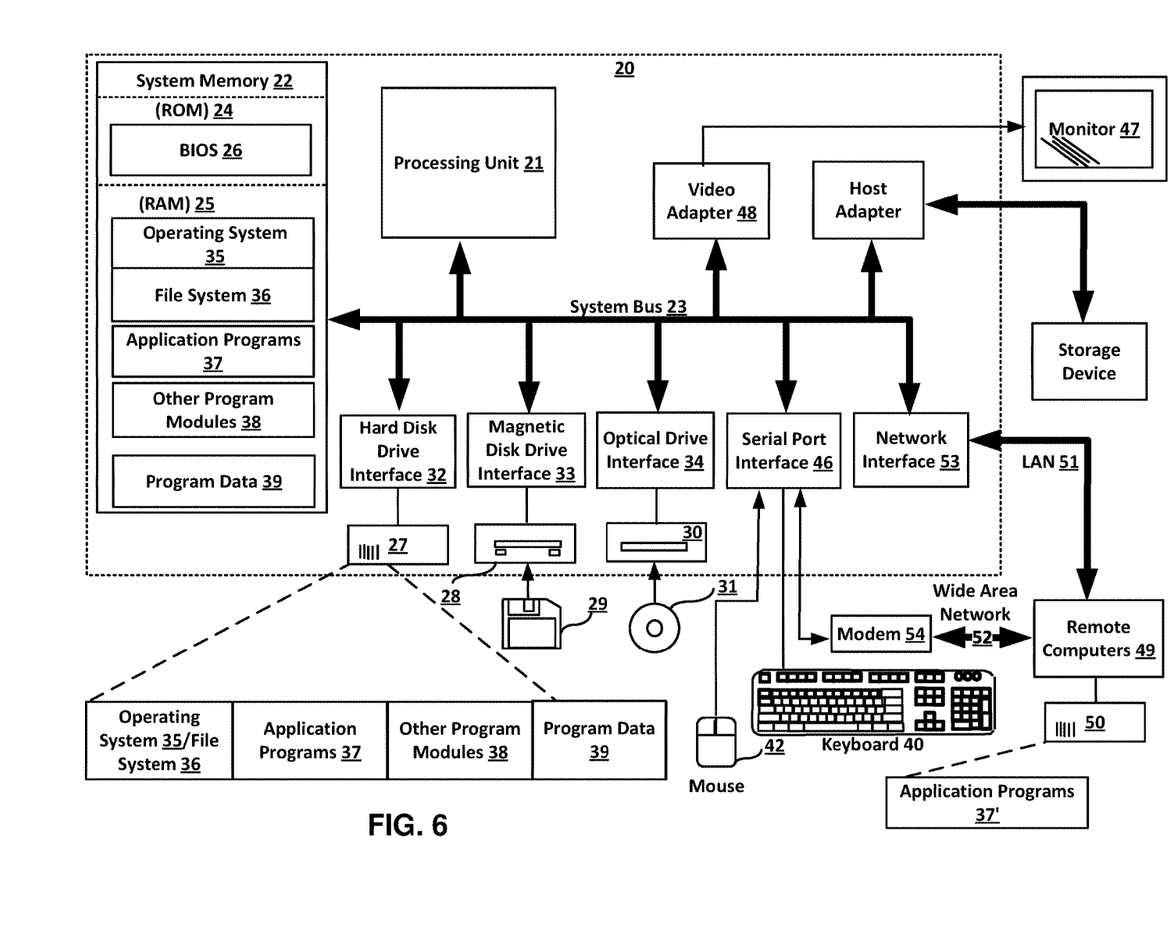
FIG. 6 illustrates an exemplary computer system which can be used for implementing the disclosure.

With reference to FIG. 6, an exemplary system for implementing the disclosure includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present disclosure. The disclosure is further defined by the following claims.

What is claimed is:

1. A method for optimization of lock detection in a change block tracker (CBT), the method comprising:
    starting, by a hardware processor, change tracking using a CBT launched on a kernel of a computer system;
    intercepting, by the hardware processor, a first lock request and moving current changes to frozen changes;
    moving, by the hardware processor, upon intercepting subsequent lock requests, changes occurring after a previous lock request to a snapshot having a name, and to the frozen changes;
    receiving, at the hardware processor, a freeze command from a backup client, wherein the freeze command indicates a name of the snapshot; and
    processing, by the hardware processor, changes to the snapshot in chronological order by;
    moving, by the hardware processor, a current snapshot to the frozen changes, if the name of the current snapshot is not the same as the name of the snapshot indicated by the freeze command, otherwise:
    moving, by the hardware processor, the current snapshot to the frozen changes and copying the previous snapshot to the current changes, and moving subsequent snapshots to the current changes.

2. The method of claim 1, wherein the snapshot is a read-only snapshot.

3. A method for optimization of lock detection in a change block tracker (CBT), the method comprising:
    in response to a snapshot creation request, generating, by a hardware processor, a first collection comprising changes to a volume of a computer system, the volume subject to change tracking and a second collection comprising changes to a snapshot that both correspond to a first snapshot name;
    intercepting, by a hardware processor, a first lock request and moving current changes to frozen changes;
    moving changes occurring after the first lock request to the first collection comprising volume changes, after a next lock request;
    saving, by a hardware processor, changes to the second collection comprising snapshot changes, upon receiving a snapshot modification request;
    moving, by the hardware processor, changes occurring after the next snapshot creation request to the second collection comprising snapshot changes and to the frozen changes upon receiving a next lock request;
    moving, by the hardware processor, changes occurring after the next lock request to a third collection comprising volume changes associated with a current snapshot name, upon subsequent lock requests;
    saving, by the hardware processor, changes to a fourth collection comprising snapshot changes associated with the current snapshot name, upon a subsequent snapshot modification request; and
    processing, by the hardware processor, snapshot changes in a chronological order upon reception of a freeze command accompanied with a snapshot name the processing comprising:
    if the current snapshot name is not the same as the snapshot name indicated by the freeze command, moving the volume changes corresponding to the current snapshot name to the frozen changes and deleting any changes to the fourth collection, otherwise:

moving the volume changes corresponding to the current snapshot name to the frozen changes, and copying changes to the third collection to the current changes, and moving changes to the fourth collection to the frozen changes and copying the changes to the fourth collection to the current changes.

4. The method of claim 3, wherein the collections comprise writable snapshot.

5. The method of claim 3, wherein the frozen changes are deleted after a backup is successfully created.

6. The method of claim 3, wherein the frozen changes are merged with current changes collection in case of a failed backup, and reverted changes are used on a next backup.

7. The method of claim 1, further comprising:
making the frozen changes available to the backup client.

8. The method of claim 1, further comprising: prior to intercepting the first lock request, generating, by the hardware processor, the snapshot having the name upon reception of a snapshot creation requests.

9. The method of claim 3, further comprising:
prior to generating the first collection:
launching a CBT on a kernel of the computer system.

10. The method of claim 9, further comprising, prior to generating the first collection and after launching the CBT:
starting change tracking by the CBT on the volume.

11. The method of claim 3, wherein the freeze command is received from a backup client.

12. The method of claim 3 comprising:
creating, by the hardware processor, the third collection comprising volume changes and a fourth collection comprising snapshot changes, both collections associated with a current snapshot name, upon receiving a next snapshot creation request after receiving the snapshot modification request.

13. The method of claim 3, further comprising:
moving subsequent volume changes to the current changes and deleting the subsequent snapshot changes; and
making the frozen changes available to read for the backup client.

14. A method for optimization of lock detection in a change block tracker (CBT), the method comprising:
intercepting, by a hardware processor, a first lock request and moving current changes to frozen changes, wherein change tracking is started on a volume of a computer;
moving, by the hardware processor, upon intercepting subsequent lock requests, changes occurring after a previous lock request to a snapshot on the volume associated with a first snapshot name, and moving the changes to the frozen changes;

receiving, at the hardware processor, a freeze command from a backup client, wherein the freeze command indicates a second snapshot name; and
moving, by the hardware processor, a current snapshot to the frozen changes, when the first snapshot name is not the same as the second snapshot name, otherwise:
moving, by the hardware processor, the current snapshot to the frozen changes and copying the previous snapshot to the current changes, and moving subsequent snapshots to the current changes.

15. The method of claim 14, further comprising, prior to intercepting the first lock request: generating, by the hardware processor, the snapshot on the volume upon reception of a snapshot creation request.

16. The method of claim 14, further comprising:
making the frozen changes available to the backup client after the moving the current snapshot to the frozen changes.

17. A system for optimization of lock detection in a change block tracker (CBT), the method comprising:
a hardware processor configured to:
intercept a first lock request and moving current changes to frozen changes, wherein change tracking is started on a volume of a computer;
move upon intercepting subsequent lock requests, changes occurring after a previous lock request to a snapshot on the volume associated with a first snapshot name, and moving the changes to the frozen changes;
receive a freeze command from a backup client, wherein the freeze command indicates a second snapshot name; and
move a current snapshot to the frozen changes, when the first snapshot name is not the same as the second snapshot name, otherwise:
move the current snapshot to the frozen changes and copying the previous snapshot to the current changes, and moving subsequent snapshots to the current changes.

18. The system of claim 17, wherein the snapshot is a read-only snapshot.

19. The system of claim 17, wherein the hardware processor is further configured to, prior to intercepting the first lock request: generate, by the hardware processor, the snapshot on the volume upon reception of a snapshot creation request.

20. The system of claim 17, wherein the hardware processor is further configured to:
make the frozen changes available to the backup client after the moving the current snapshot to the frozen changes.

* * * * *